(12) United States Patent
Zhang et al.

(10) Patent No.: US 12,456,887 B2
(45) Date of Patent: Oct. 28, 2025

(54) METHOD FOR WIRELESS CHARGING AND COMMUNICATION VIA CLAMPING PULSES

(71) Applicant: Advanced Neuromodulation Systems, Inc., Plano, TX (US)

(72) Inventors: Hongxuan Zhang, Austin, TX (US); Li Sun, Plano, TX (US); Luis Ortiz Hernandez, Dallas, TX (US)

(73) Assignee: Advanced Neuromodulation Systems, Inc., Plano, TX (US)

(*) Notice: Subject to any disclaimer, the term of this patent is extended or adjusted under 35 U.S.C. 154(b) by 1129 days.

(21) Appl. No.: 17/353,768

(22) Filed: Jun. 21, 2021

(65) Prior Publication Data

US 2022/0407366 A1   Dec. 22, 2022

(51) Int. Cl.
| | | |
|---|---|---|
| H02J 50/80 | (2016.01) | |
| A61N 1/378 | (2006.01) | |
| H02J 7/00 | (2006.01) | |
| H02J 7/02 | (2016.01) | |
| H02J 50/10 | (2016.01) | |
| H04L 27/156 | (2006.01) | |

(52) U.S. Cl.
CPC ............ H02J 50/80 (2016.02); A61N 1/3787 (2013.01); H02J 7/0047 (2013.01); H02J 7/02 (2013.01); H02J 50/10 (2016.02); H04L 27/156 (2013.01); H04L 27/1563 (2013.01)

(58) Field of Classification Search
CPC .. H02J 50/80; H02J 50/10; H02J 50/12; H02J 7/0047; H02J 7/02; A61N 1/3787; H04L 27/156

See application file for complete search history.

(56) References Cited

U.S. PATENT DOCUMENTS

| | | | |
|---|---|---|---|
| 5,411,537 A | 5/1995 | Munshi et al. | |
| 5,702,431 A | 12/1997 | Wang et al. | |
| 8,731,682 B2 | 5/2014 | Winstrom | |
| 9,209,634 B2 | 12/2015 | Cottrill et al. | |
| 2005/0288739 A1 | 12/2005 | Hassler et al. | |
| 2013/0096653 A1* | 4/2013 | Winstrom | A61N 1/36128 607/61 |
| 2019/0238053 A1* | 8/2019 | Oliva | H02J 50/001 |
| 2020/0324126 A1 | 10/2020 | Winstrom | |
| 2020/0381960 A1* | 12/2020 | Goodchild | H02J 7/00034 |

\* cited by examiner

*Primary Examiner* — David V Henze-Gongola (74) *Attorney, Agent, or Firm* — Norton Rose Fulbright US LLP (57) ABSTRACT

A method of operation of a wireless charger device includes transmitting a wireless charging signal to a receiver device. The method further includes receiving a clamping pulse from the receiver device based on the wireless charging signal. The clamping pulse indicates a first value associated with a falling edge of the clamping pulse and further indicates a second value associated with a rising edge of the clamping pulse. The clamping pulse is detected based on a comparison of a first threshold with the first value and further based on a comparison of a second threshold with the second value, and the second threshold is different than the first threshold. The method further includes determining a charging state of the receiver device based on the clamping pulse.

8 Claims, 6 Drawing Sheets

METHOD FOR WIRELESS CHARGING AND COMMUNICATION VIA CLAMPING PULSES

TECHNICAL FIELD

The present disclosure generally relates to wireless charging of devices, such as implantable pulse generator (IPG) devices.

BACKGROUND

Implantable medical devices include implantable pulse generator (IPG) devices and other wireless devices. For example, an IPG device may provide electrical stimulation to the brain, spinal cord, or other area of a patient. In some patients, electrical stimulation from an IPG device may disrupt or inhibit the transmission of nervous system signals associated with pain sensation. In some cases, IPG devices may improve patient quality of life and mobility and may reduce patient reliance on certain types of treatment, such as pain relief drug therapies. As a result, implantable medical devices, such as IPG devices, can potentially benefit a wide variety of patients.

An IPG device or other implantable medical device may include a battery that is wirelessly charged by a charger device. In some circumstances, the charging process may be time consuming or inconvenient for some patients, which may cause some healthcare professionals or patients to recommend or choose other treatments. To illustrate, during the charging process, the charger device may detect signals from the implantable medical device indicating a charging state of the implantable medical device (e.g., a "ready for charging" state, a partially charged state, or a fully charged state). In some circumstances, noise or interference may reduce the ability of the charger device to detect the signals. It is noted that in some cases, failure of the charger device to detect one or more signals due to the presence of noise may increase a duration of the charging process. Further, in some circumstances, an overheating condition associated with an implantable medical device could potentially occur if the charging process is continued beyond a certain duration (e.g., due to problems caused by noise during the charging process). Some wireless charging devices, such as wireless charging devices utilized for smartphones or smartwatches, address the noise issue by utilizing precise alignment of the charging device and the device being charged. However, due to the nature of implantable medical devices, precise alignment between the charging device and the implanted medical device may not be feasible. Thus, utilizing precise alignment to address noise may not be a suitable solution for addressing noise during wireless charging of implantable medical devices.

SUMMARY

In some aspects of the disclosure, a charger device may use multiple windows to measure a signal (such as a clamping pulse) indicating a charging state of a receiver device. For example, the charger device may use a first window of a first duration to measure a noise level associated with the signal and may use a second window of a second duration to measure one or more other parameters, such as maximum, minimum, and average values associated with the signal. The second duration may be greater than the first duration. As a result, reliability and sensitivity of detection of clamping pulses received from the receiver device may be improved, which may reduce or avoid instances of failure to detect a clamping pulse in some cases.

In some examples, the charger device may use the measurements performed based on the multiple windows to determine multiple thresholds for clamping pulse detection. For example, a first threshold (e.g., a "low" threshold) may be used to detect a falling edge of a clamping pulse, and a second threshold (e.g., a "high" threshold) may be used to detect a rising edge of the clamping pulse. Use of the multiple thresholds may improve tracking of clamping pulses as compared to a single-threshold technique, such as by reducing or avoiding instances of "false positive" detection of clamping pulses that can result from noise or interference (e.g., due to sudden signal spikes or drops that may result from noise or interference). By reducing or avoiding such false positive detection of clamping pulses, the charger device may avoid premature termination of the charging process that may result due to false positive identification of one or more clamping pulses. As a result, reliability and sensitivity of detection of clamping pulses may be improved as compared to some other techniques, such as single-threshold techniques.

In some implementations, the charger device may use one or more of a pulse duration of a clamping pulse or an interval between successive clamping pulses to identify noise or interference, which may be ignored by the charger device. For example, if a pulse duration of a clamping pulse is outside a range of reference pulse durations, the charger device may ignore (or "reject") the clamping pulse. Alternatively or in addition, if an interval (e.g., "gap") between successive clamping pulses is outside a range of reference intervals (such as if the interval is very short), the charger device may reject or ignore one or more clamping pulses. As a result, identification of "false positive" clamping pulses may be reduced or avoided, which may improve accuracy of the charging process (such as by avoiding premature termination of the charging process that may result due to false positive identification of one or more clamping pulses).

DETAILED DESCRIPTION

Figure 1:
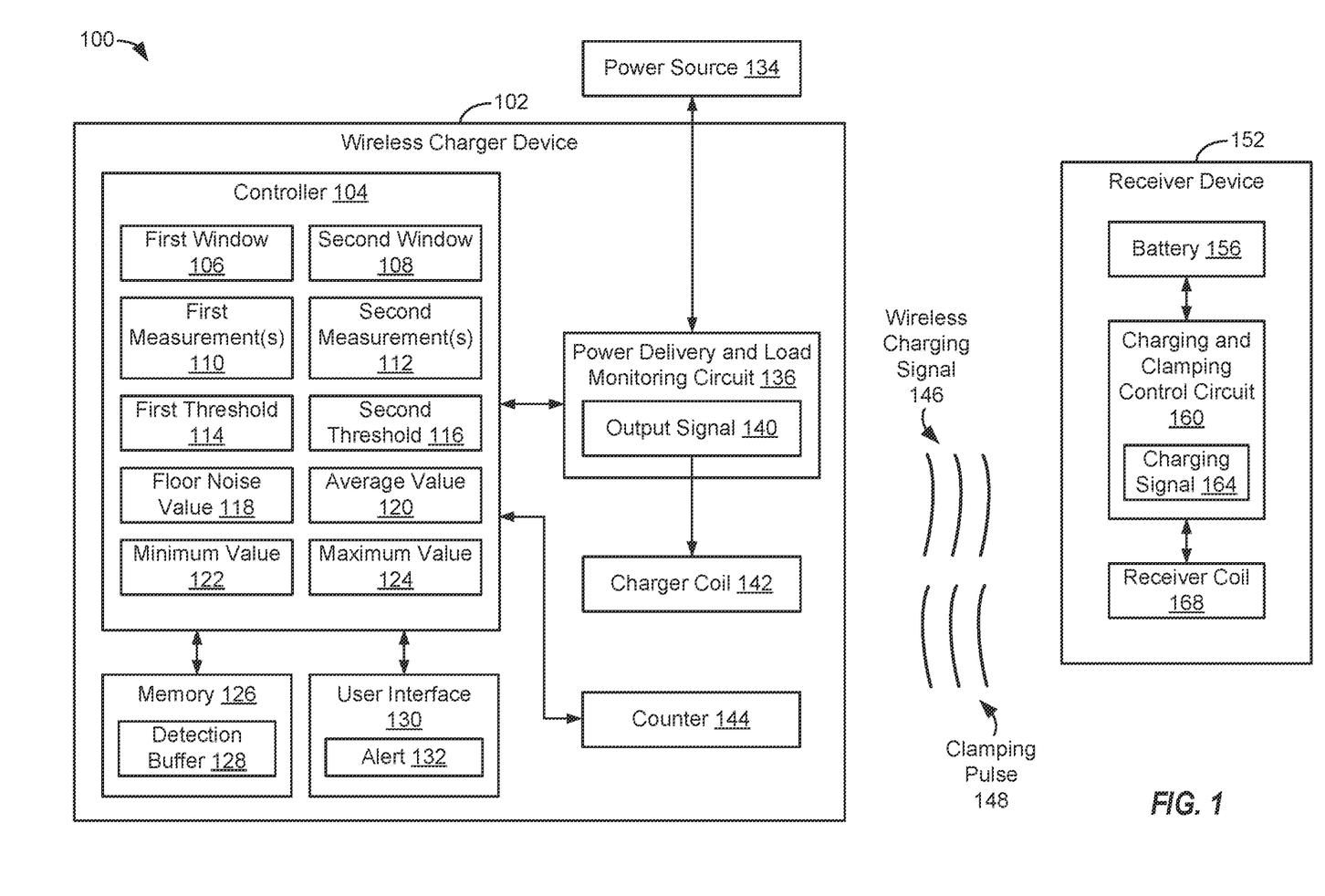
FIG. 1 is a block diagram illustrating an example of a system for wireless charging according to some aspects of the disclosure.

FIG. 1 is a block diagram illustrating an example of a system 100 for wireless charging according to some aspects of the disclosure. The system 100 may include a wireless charger device 102 and a receiver device 152. In some examples, the receiver device 152 may include or correspond to an implantable medical device, such as an implantable pulse generator (IPG) device. The wireless charger device 102 may be configured to wirelessly charge the receiver device 152 to enable the receiver device 152 to perform one or more operations, such as stimulation or inhibition of certain nerve signals within a patient, as an illustrative example.

The wireless charger device 102 may include a controller 104 and a memory 126. The controller 104 may be coupled to the memory 126. In some examples, the memory 126 stores instructions executable by the controller 104 to initiate, perform, or control one or more operations described herein. In some examples, the memory 126 includes a non-volatile memory. Alternatively or in addition, the memory 126 may include a volatile memory, such as a cache that is accessible to the controller 104. In some examples, the memory 126 includes or is coupled to a detection buffer 128.

The wireless charger device 102 may also include a power delivery and load monitoring circuit 136 and a charger coil 142. In addition, the wireless charger device 102 may include or may be coupled to a power source 134. For example, the power source 134 may include one or more of a mains electricity supply, a battery, or a generator, as illustrative examples. The power delivery and load monitoring circuit 136 may be coupled to the controller 104, to the power source 134, to the charger coil 142. The power delivery and load monitoring circuit 136 may be configured to provide power from the power source 134 to the charger coil 142.

The wireless charger device 102 may further include a user interface 130. In some implementations, the user interface 130 includes or corresponds to a graphical user interface (GUI), such as a touchscreen interface. Alternatively or in addition, the user interface 130 may include one or more buttons, such as a power-on button. Alternatively or in addition, the user interface 130 may include a communication interface, such as a wired communication interface (e.g., a universal serial bus (USB) interface) or a wireless communication interface (such as a wireless local area connection (WLAN) interface or a cellular interface).

The wireless charger device 102 may further include a counter 144. In some examples, the counter 144 corresponds to a hardware counter that is coupled to or included in the controller 104. Alternatively or in addition, operations described with reference to the counter 144 may be implemented using instructions (e.g., firmware or software) executed by the controller 104.

The receiver device 152 may include a battery 156, a charging and clamping control circuit 160, and a receiver coil 168. The battery 156 may be coupled to the charging and clamping control circuit 160, and the charging and clamping control circuit 160 may be coupled to the receiver coil 168. The charging and clamping control circuit 160 may be configured to provide power to the battery 156 from the receiver coil 168.

During operation, the wireless charger device 102 may transmit a wireless charging signal 146 to the receiver device 152. To illustrate, in some examples, a medical service provider or a patient may bring the wireless charger device 102 within proximity of the receiver device 152 and may initiate a charging of the receiver device 152 (e.g., by pressing a power-on button of the wireless charger device 102). In some examples, the controller 104 may detect initiation of charging of the receiver device 152 and may cause the power delivery and load monitoring circuit 136 to couple the charger coil 142 to the power source 134. Upon coupling the charger coil 142 to the power source 134, the charger coil 142 may draw power from the power source 134, such as by drawing an output signal 140 from the power source 134 via the power delivery and load monitoring circuit 136. In some examples, the power delivery and load monitoring circuit 136 may perform one or more of filtering, modulation, duty cycling, or power inversion of power supplied by the power source 134 to generate the output signal 140. For example, the power delivery and load monitoring circuit 136 may include a pulse width modulation (PWM) circuit configured to apply PWM to a power signal supplied by the power source 134 to generate the output signal 140.

Drawing the output signal 140 may cause the charger coil 142 to transmit the wireless charging signal 146. For example, the output signal 140 may correspond to an alternating current (AC) signal that causes the charger coil 142 to generate a magnetic field corresponding to the wireless charging signal 146.

The receiver device 152 may receive the wireless charging signal 146. For example, the receiver coil 168 may magnetically couple to the charger coil 142 and may generate a charging signal 164 based on the wireless charging signal 146. The charging and clamping control circuit 160 may provide the charging signal 164 to the battery 156 to charge the battery 156. The charging and clamping control circuit 160 may control charging of the battery 156, such as by performing one or more operations to condition the charging signal 164 (e.g., filtering, modulation, duty cycling, or rectification). In some implementations, conditioning of the charging signal 164 may reduce or avoid damage to the battery 156, such as by filtering a transient voltage spike from the charging signal 164 that could potentially cause damage or wear to the battery 156.

In some examples, the receiver device 152 may wirelessly communicate with the wireless charger device 102 after initiation of a charging process. For example, upon receiving the wireless charging signal 146, the receiver device 152 may generate a clamping pulse 148 to indicate acknowledgement of the charging process. As another example, as described further below, the receiver device 152 may generate one or more clamping pulses 148 to indicate a charging state of the receiver device 152, to terminate the charging process, or both. As an illustrative example, a particular length of time (such as 60 seconds, 90 seconds, or another length of time) between clamping pulses 148 may indicate to terminate the charging process.

To further illustrate, in some examples, the charging and clamping control circuit 160 may cycle charging of the battery 156 during transmission of the wireless charging signal 146 by the wireless charger device 102. For example, during a first portion of a cycle, the charging and clamping control circuit 160 may supply a first magnitude of current to the battery 156 via the charging signal 164, and during a second portion of the cycle, the charging and clamping control circuit 160 may supply a second magnitude of current to the battery 156 via the charging signal 164. The second magnitude of current may be different than the first magnitude of current. In some implementations, to change the magnitude of current provided to the battery 156, the charging and clamping control circuit 160 may clamp one or more terminals of the receiver coil 168 to a reference potential, such as a ground potential.

While providing the wireless charging signal 146 the receiver device 152, the wireless charger device 102 may perform measurements of the output signal 140 and may determine, based on the measurements, one or more parameters associated with charging the receiver device 152. In some aspects, the wireless charger device 102 performs the measurements using a multi-window technique. For example, during a first window 106 of a first duration, the wireless charger device 102 may perform one or more first measurements 110 of the output signal 140. During a second window 108 of a second duration greater than the first duration, the wireless charger device 102 may perform one or more second measurements 112 of the output signal 140.

Based on the one or more first measurements, the wireless charger device 102 may determine one or more first parameters associated with the output signal 140 and may configure a first threshold 114 based on the one or more first parameters. Based on the one or more second measurements, the wireless charger device 102 may determine one or more second parameters associated with the output signal 140 and may configure a second threshold 116 based on the one or more second parameters. In an illustrative implementation, the one or more first parameters may include a floor noise value 118 (e.g., a peak-to-peak floor noise) associated with the output signal 140, and the one or more second parameters may include an average value 120 of the output signal 140, a minimum value 122 of the output signal 140, and a maximum value 124 of the output signal 140. In some examples, the wireless charger device 102 dynamically determines the first threshold 114 and the second threshold 116 during transmission of the wireless charging signal 146 to the receiver device 152.

Figure 2:
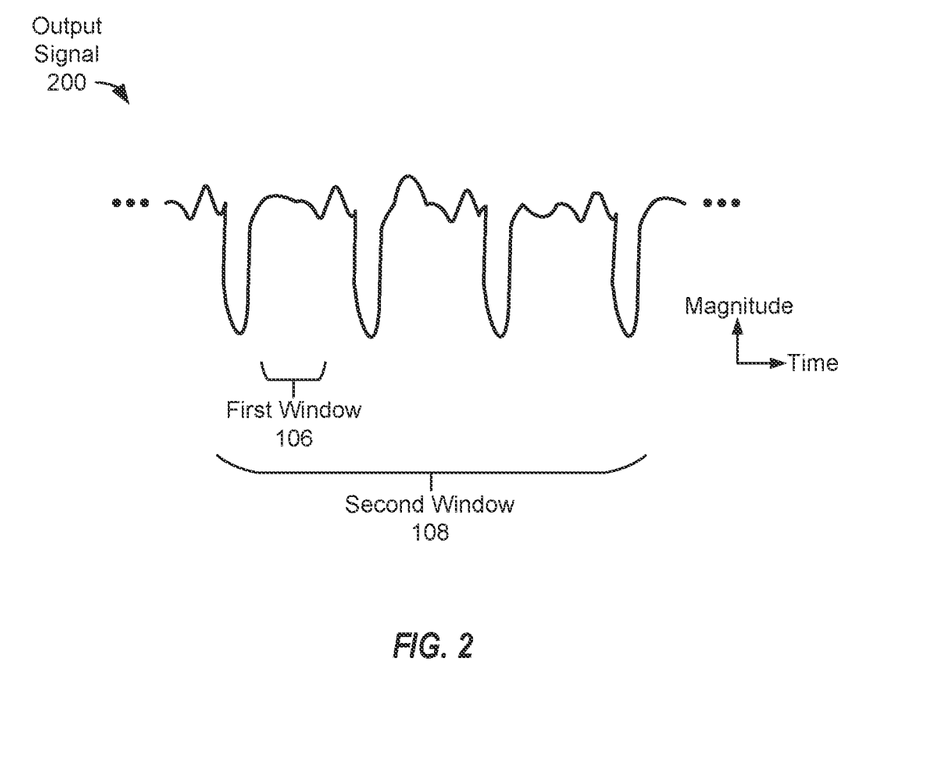
FIG. 2 depicts an example of a portion of an output signal according to some aspects of the disclosure.

To further illustrate, FIG. 2 depicts an example of a portion of an output signal 200 according to some aspects of the disclosure. The wireless charger device 102 may perform the one or more first measurements 110 of the output signal 200 during the first window 106 and may perform the one or more second measurements 112 of the output signal 200 during the second window 108. FIG. 2 also illustrates that the first window 106 may have a first duration (e.g., a first number of milliseconds) that is less than a second duration (e.g., a second number of milliseconds) of the second window 108. Although the example of FIG. 2 depicts that the first window 106 may occur during the second window 108, in some other examples, the first window 106 may occur outside the second window 108 or may partially overlap the second window 108.

Referring again to FIG. 1, in some examples, the wireless charger device 102 may determine the first threshold 114 in accordance with Equation 1 and may determine and the second threshold 116 in accordance with Equation 2:

$$T1=C1*(\text{average}(\text{window2})-\text{min}(\text{window2}))+\text{min}(\text{window2})+\text{floor\_noise} \quad \text{(Eqtn. 1)}.$$

$$T2=C2*(\text{average}(\text{window2})-\text{min}(\text{window2}))+\text{min}(\text{window2})+\text{floor\_noise} \quad \text{(Eqtn. 2)}.$$

In Equation 1, T1 may indicate the first threshold 114, and in Equation 2, T2 may indicate the second threshold 116. In Equations 1 and 2, average(window2), min(window2), and floor_noise may indicate the average value 120, the minimum value 122, and the floor noise value 118, respectively. In some examples, C1 and C2 represent coefficients that may be selected based on the particular implementation. In an illustrative example, C1 corresponds to ⅓, and C2 corresponds ⅔. In some examples, the coefficients C1 and C2 may be dynamically changed during operation. For example, adaptive thresholding may be performed by adjusting one or both of the coefficients C1 and C2, such as from ⅓ and ⅔ to ⅖ and ⅘, respectively.

Alternatively or in addition to determining the first threshold 114 and the second threshold 116, the wireless charger device 102 may use one or more parameters described herein to perform one or more other operations. In some examples, the wireless charger device 102 may select a mode of operation based on a value of floor_noise. For example, if floor_noise>0.5*(average(window2)−min(window2)), then the wireless charger device 102 may apply a particular filter to the output signal 140, such as a low pass filter, which may reduce floor_noise in some cases. If after applying the low pass filter to the output signal 140 floor_noise remains greater than 0.5*(average(window2)−min(window2)), the wireless charger device 102 may use a single threshold detection technique (e.g., instead of using the first threshold 114 and the second threshold 116) to detect one or more clamping pulses 148. In this manner, a single threshold may be utilized when the signal to noise ratio or other properties of the clamping pulse are optimal and the charging may utilize the dual threshold technique when the quality of the clamping pulse degrades (e.g., high signal to noise ratio).

In some aspects of the disclosure, the wireless charger device 102 may use the first threshold 114 and the second threshold 116 to detect one or more clamping pulses 148 generated by the receiver device 152. To illustrate, the receiver device 152 may change the amount of current provided to the battery 156 via the charging signal 164, such as by cycling charging of the battery 156. Changing the amount of current provided to the battery 156 may also change a magnitude of the output signal 140 (e.g., via mutual inductance between the charger coil 142 and the receiver coil 168). For example, clamping the receiver coil 168 to a reference potential may result in the clamping pulse 148, which may be detected by the wireless charger device 102. To further illustrate, the power delivery and load monitoring circuit 136 may monitor a magnitude of the output signal 140 and may detect the clamping pulse 148 based on changes in the magnitude of the output signal 140 using the first threshold 114 and the second threshold 116.

Figure 3:
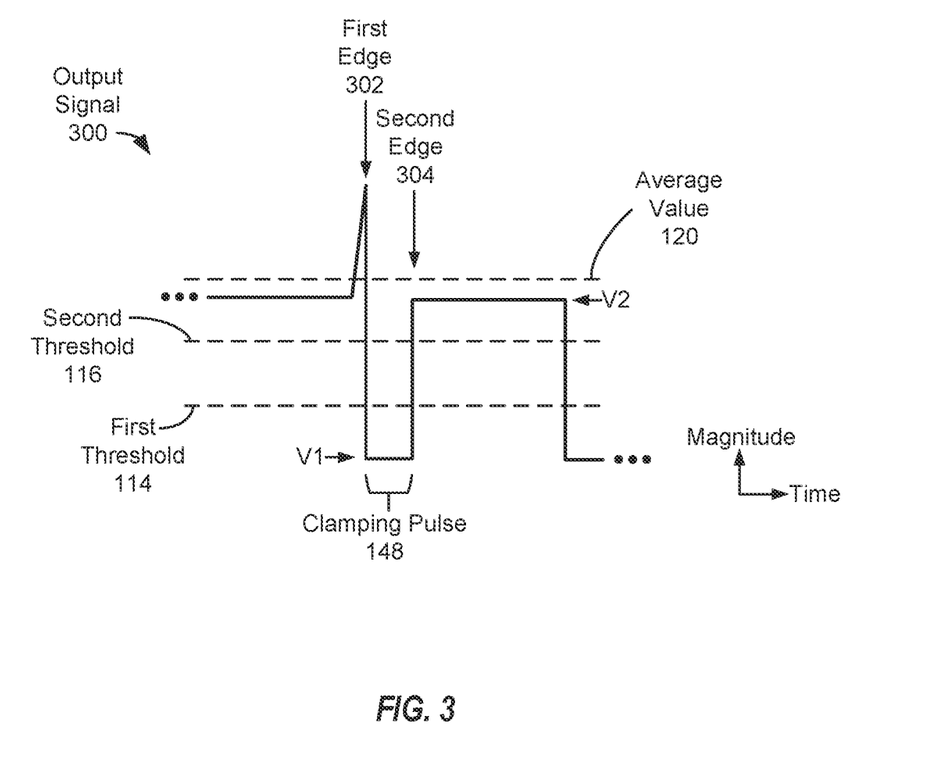
FIG. 3 depicts another example of a portion of an output signal according to some aspects of the disclosure.

To further illustrate, FIG. 3 depicts another example of a portion of an output signal 300 according to some aspects of the disclosure. The output signal 300 may include or may indicate a clamping pulse, such as the clamping pulse 148 of FIG. 1. Although features (such as the clamping pulse 148) of the example of the output signal 300 in FIG. 3 are depicted as linear for illustration, it should be appreciated that the output signal 140 may be sinusoidal or non-linear.

The clamping pulse 148 may indicate a first value V1 associated with a first edge 302 of the clamping pulse 148 (e.g., a falling edge, which may correspond to the beginning of the clamping pulse 148). The clamping pulse 148 may also indicate a second value V2 associated with a second edge of the clamping pulse 148 (e.g., a rising edge, which may correspond to the end of the clamping pulse 148). For example, the first value V1 may correspond to a local minimum value of the clamping pulse 148, and the second value V2 may correspond to a local maximum value of the clamping pulse 148. In some aspects of the disclosure, the wireless charger device 102 may detect the clamping pulse 148 based on a comparison of the first threshold 114 with the first value V1 and further based on a comparison of the second threshold 116 with the second value V2.

To illustrate, during transmission of the wireless charging signal 146, the wireless charger device 102 may monitor the clamping pulse 148. During the monitoring, the wireless charger device 102 may compare the magnitude of the clamping pulse 148 to the first threshold 114. If the wireless charger device 102 detects that the magnitude of the clamping pulse 148 fails to satisfy (e.g., is less than, or is less than or equal to) the first threshold 114, then the wireless charger device 102 may detect the first edge 302 of the clamping pulse 148. After detecting the first edge 302, the wireless charger device 102 may monitor the clamping pulse 148 and compare the magnitude of the clamping pulse 148 to the second threshold 116. If the wireless charger device 102 detects that the magnitude of the clamping pulse 148 satisfies (e.g., is greater than, or is greater than or equal to) the second threshold 116, then the wireless charger device 102 may detect the second edge 304 of the clamping pulse 148. Based on the first edge 302 and the second edge 304, the wireless charger device 102 may detect the clamping pulse 148.

In some examples, use of multiple different thresholds for clamping pulse detection may improve performance of a charging system as compared to certain other techniques, such as a single-threshold technique. For example, a sudden drop in the clamping pulse due to noise may be incorrectly detected as a falling edge of the clamping pulse (e.g., because the sudden drop may briefly fall below the single threshold), or a sudden spike in the clamping pulse due to noise may be incorrectly detected as a rising edge of the clamping pulse (e.g., because the sudden spike may briefly exceed the single threshold). Utilizing multiple different thresholds may improve tracking and detection of clamping pulses as compared to a single-threshold technique by reducing or avoiding instances of "false positive" detection of clamping pulses that can result from noise or interference (e.g., due to sudden signal spikes or drops that may result from noise or interference). By reducing or avoiding such false positive detection of clamping pulses, the wireless charger device 102 may avoid premature termination of the charging process that may result due to false positive identification of one or more clamping pulses. As a result, reliability and sensitivity of detection of clamping pulses may be improved as compared to some other techniques, such as single-threshold techniques.

Referring again to FIG. 1, the receiver device 152 may indicate a charging state of the receiver device 152 based on the clamping pulse 148. For example, in some implementations, the clamping pulse 148 may indicate to the wireless charger device 102 that the battery 152 has reached a threshold charging state. As a non-limiting illustrative example, the battery 156 may be associated with a charge capacity (such as a particular number of watt-hours (Wh)), and the threshold charging state may correspond to charging of the battery 156 to eighty percent of the charge capacity. In response to detecting the threshold charging state of the battery 156, the charging and clamping control circuit 160 may reduce or terminate charging of the battery 156, such as by duty cycling charging of the battery 156 using one or more clamping pulses 148.

The wireless charger device 102 may determine a charging state of the receiver device 152 based on detecting the clamping pulse 148, such as by determining that the receiver device 152 has reached the threshold charging state. In some implementations, the wireless charger device 102 may adjust transmission of the wireless charging signal 146 to the receiver device 152 based on the charging state, such as by reducing an amount of power supplied to the receiver device 152 (e.g., by reducing a magnitude of the wireless charging signal 146 or by terminating transmission of the wireless charging signal 146).

Although certain examples are described with reference to a single clamping pulse 148, it is noted that some implementations may use multiple clamping pulses 148 to indicate a charging state of the receiver device 152. As an example, a sequence of multiple clamping pulses 148 (e.g., within a particular time interval) or a duration of one or more clamping pulses 148 may indicate a charging state of the receiver device 152. As a non-limiting illustrative example, a first number or duration of clamping pulses 148 received within a particular time interval may indicate a first charging state (e.g., eighty percent charged), and a second number or duration of clamping pulses 148 received within a particular time interval may indicate a second charging state (e.g., ninety percent charged). To further illustrate, certain examples are described further with reference to FIG. 4.

Figure 4:
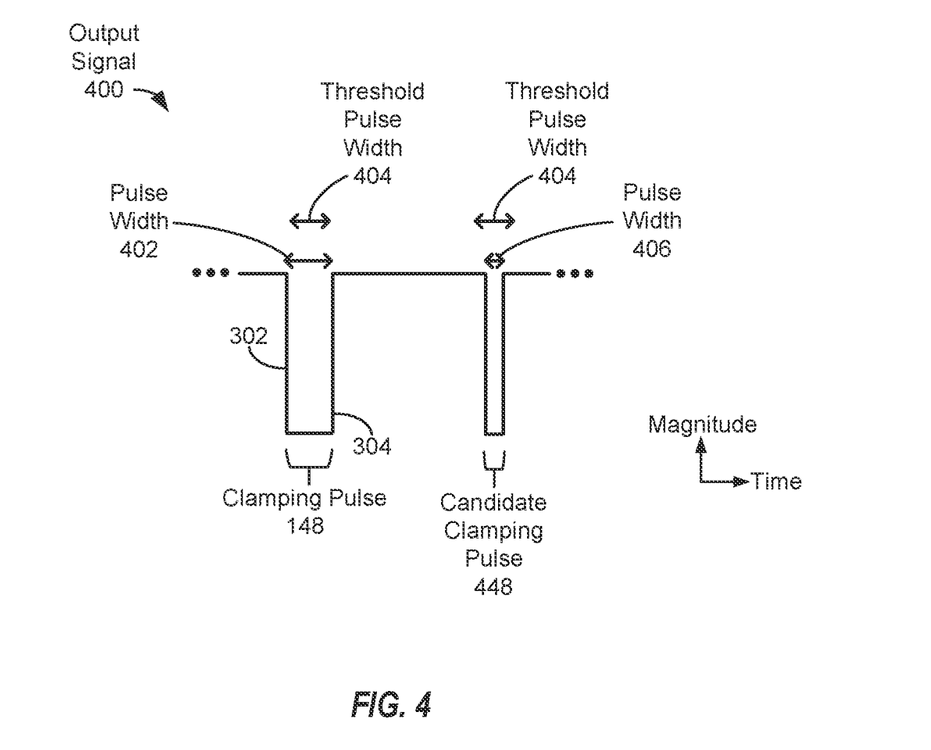
FIG. 4 depicts another example of a portion of an output signal according to some aspects of the disclosure.

FIG. 4 depicts another example of a portion of an output signal 400 according to some aspects of the disclosure. In some aspects, the wireless charger device 102 may validate the clamping pulse 148 based on a pulse width 402 of the clamping pulse 148. The pulse width 402 may correspond to or may be based on a time interval between the first edge 302 and the second edge 304. To further illustrate, the wireless charger device 102 may determine the pulse width 402 by measuring the time interval (e.g., a number of milliseconds) between the first edge 302 and the second edge 304.

The wireless charger device 102 may compare the pulse width 402 to a threshold pulse width 404. To illustrate, the wireless charger device 102 may compare a number of milliseconds corresponding to the pulse width 402 to a threshold number of milliseconds corresponding to the threshold pulse width 404. In the example of FIG. 4, the wireless charger device 102 may determine that the pulse width 402 satisfies (e.g., is greater than, or is greater than or equal to) the threshold pulse width 404.

The wireless charger device 102 may identify a charging state of the receiver device 152 based on the pulse width 402 of the clamping pulse 148. For example, in some implementations, a first value of the pulse width 402 may indicate a constant current charging state of the receiver device 152, a second value of the pulse width 402 may indicate a constant voltage charging state of the receiver device 152, and a third pulse width of the pulse width 402 may indicate a fully charged state of the receiver device 152 or a trickle charging state of the receiver device 152. In some implementations, the first value is less than the second value, and the second value is less than the third value. To further illustrate, in a non-limiting illustrative example, the first value may correspond to 0.4 milliseconds, the second value may correspond to 0.6 milliseconds, and the third value may correspond to 1.1 milliseconds.

In some other cases, a pulse width may fail to satisfy the threshold pulse width 404. To illustrate, the wireless charger device 102 may detect one or more candidate clamping pulses, such as a candidate clamping pulse 448. The wireless charger device 102 may determine, for each candidate clamping pulse of one or more candidate clamping pulses, whether a pulse width of the candidate clamping pulse satisfies the threshold pulse width 404. To illustrate, the wireless charger device 102 may determine whether a pulse width 406 of the candidate clamping pulse 448 satisfies the threshold pulse width 404. In the example of FIG. 4, the wireless charger device 102 may determine that the pulse width 406 fails to satisfy (e.g., is less than, or is less than or equal to) the threshold pulse width 404.

In some implementations, the wireless charger device 102 may reject the candidate clamping pulse 448 based on the pulse width 406 failing to satisfy the threshold pulse width 404. To illustrate, rejecting the candidate clamping pulse 448 may include determining that the candidate clamping pulse 448 fails to accurately indicate the charging state of the receiver device 152. For example, based on the pulse width 406 failing to satisfy the threshold pulse width 404, the wireless charger device 102 may determine that the candidate clamping pulse 448 is (or is likely to be) caused by noise or interference (instead of due to operation of the receiver device 152). In some examples, the wireless charger device 102 may determine that the candidate clamping pulse 448 does not count toward a number of clamping pulses that indicate a charging state of the receiver device 152.

Referring again to FIG. 1, in some implementations, the wireless charger device 102 uses the detection buffer 128 to determine the threshold pulse width 404 during transmission of the wireless charging signal 146 to the receiver device 152. For example, the wireless charger device 102 may store, at the detection buffer 128, an indication of pulse widths of multiple clamping pulses 148. The wireless charger device 102 may determine the threshold pulse width 404 based on the pulse widths. For example, the wireless charger device 102 may select the minimum pulse width of the pulse widths or the average pulse width of the pulse widths as the threshold pulse width 404. To further illustrate, in some examples, the wireless charger device 102 may use a moving average of the pulse widths as the threshold pulse width 404, such as by determining a moving average of the last three detected clamping pulses 148, as an illustrative example.

Alternatively or in addition to indicating a number of rejected clamping pulses 148, the detection buffer 128 may track or detect a duration between successive clamping pulses 148. The duration may be referred to as a "pulse train gap." In some circumstances, a relatively long pulse train gap may indicate a potentially unstable charging location or a potential overheating event. In some implementations, the wireless charger device 102 may determine a charging state of the receiver device 152, or may terminate the charging process, based on a duration between successive clamping pulses 148. To illustrate, in some examples, the wireless charger device 102 may use a threshold time interval between successive clamping pulses 148 (such as a gap of at least 60 seconds or 90 seconds during which no in clamping pulses 148 are detected) for charging process termination. In such examples, if the wireless charger device 102 fails to detect at least one clamping pulse 148 during the threshold time interval, the wireless charger device 102 may terminate the charging process.

In some examples, the wireless charger device 102 may generate an alert 132 (e.g., using the user interface 130) based on a number of rejected candidate clamping pulses satisfying a threshold number of rejected candidate clamping pulses, based on a pulse train gap between clamping pulses satisfying a threshold pulse train gap, or both. For example, the counter 144 may store a value indicating a number of rejected candidate clamping pulses (or consecutive rejected candidate clamping pulses). After rejecting a particular candidate clamping pulse (such as the candidate clamping pulse 448), the wireless charger device 102 may adjust the value of the counter 144 and determine (e.g., based on the adjusted value) that the number of rejected candidate clamping pulses satisfies the threshold number of rejected candidate clamping pulses. In another example, the value of the counter 144 may indicate a duration of a pulse train gap between successive clamping pulses. Based on the number of rejected candidate clamping pulses satisfying the threshold number of rejected candidate clamping pulses, or based on the duration of the pulse train gap satisfying a threshold duration, the wireless charger device 102 may generate the alert 132. In some examples, the alert 132 includes one or more of a graphical alert (e.g., a message presented visually via a touchscreen) or an audio alert (e.g., an instruction for an operate of the wireless charger device 102). In some circumstances, the alert 132 may indicate a potentially abnormal charging situation, such as a potentially unstable charging location.

In some implementations, the wireless charger device 102 may reset the value of the counter 144. For example, after rejecting the candidate clamping pulse 448, the wireless charger device 102 may reset the value of the counter 144 based on detecting a particular number of clamping pulses 148. In some examples, the particular number corresponds to ten.

Depending on the particular implementation, the wireless charger device 102 may operate based on a "threshold-first" technique, based on a "width-first" technique, or based on a parallel technique that concurrently monitors magnitude and pulse width associated with the output signal 140. In an example of a threshold-first technique, the wireless charger device 102 may first detect that the first edge 302 satisfies the first threshold 114 and that the second edge 304 satisfies the second threshold 116. Based on detecting that the first edge 302 satisfies the first threshold 114 and that the second edge 304 satisfies the second threshold 116, the wireless charger device 102 may then compare the pulse width 402 to the threshold pulse width 404. In an example of a width-first technique, the wireless charger device 102 may first detect that the pulse width 402 satisfies the threshold pulse width 404. Based on detecting that the pulse width 402 satisfies the threshold pulse width 404, the wireless charger device 102 may then compare one or more of the first edge 302 to the first threshold 114 or the second edge 304 to the second threshold 116. In an example of a parallel technique, the wireless charger device 102 may compare one or more of the first edge 302 to the first threshold 114 or the second edge 304 to the second threshold 116 in parallel with comparing the pulse width 402 to the threshold pulse width 404.

Figure 5:
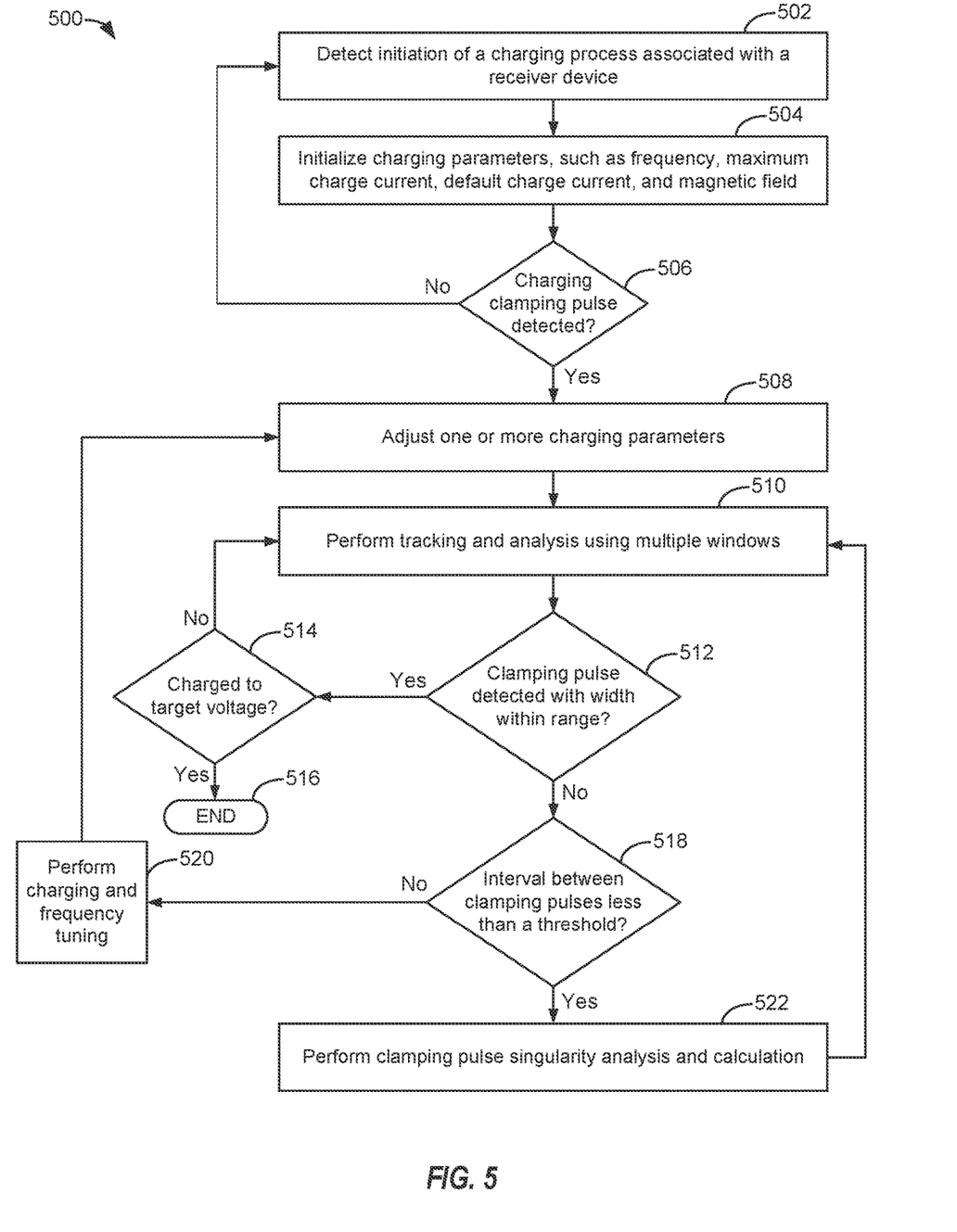
FIG. 5 is a flow chart illustrating an example of a method of operation of a wireless charger device according to some aspects of the disclosure.

FIG. 5 is a flow chart illustrating an example of a method 500 of operation of a wireless charger device according to some aspects of the disclosure. In some examples, the wireless charger device 102 performs the method 500.

The method 500 may include detecting initiation of a charging process associated with a receiver device, at 502. For example, the controller 104 may detect user input at the wireless charger device 102 indicating the initiation of the charging process, such as by detecting pressing of a power-on button of the wireless charger device 102. The charging process may include providing power to the receiver device 152.

The method 500 may further include initializing charging parameters, at 504. For example, the charging parameters may include one or more of a frequency of the charging process (e.g., a frequency of the output signal 140), a maximum charge current of the charging process (e.g., a maximum current magnitude of the output signal 140), a default charge current of the charging process (e.g., a default current magnitude of the output signal 140), or a magnetic field associated with the charging process (e.g., a magnetic flux density of the wireless charging signal 146).

The method 500 may further include determining whether a charging clamping pulse is detected, at 506. For example, the charging clamping pulse may correspond to an initial clamping pulse transmitted by the receiver device 152 to acknowledge initiation of the charging process.

If no charging clamping pulse is detected, the method 500 may continue at 502. If a charging clamping pulse is detected, the method 500 may further include adjusting one or more charging parameters based on the charging clamping pulse, at 508. For example, in some implementations, the one or more charging parameters may include one or more of a frequency of the charging process (e.g., a frequency of the output signal 140), a maximum charge current of the charging process (e.g., a maximum current magnitude of the output signal 140), a default charge current of the charging process (e.g., a default current magnitude of the output signal 140), or a magnetic field associated with the charging process (e.g., a magnetic flux density of the wireless charging signal 146). To further illustrate, the wireless charger device 102 may adjust the one or more charging parameters to increase or decrease a frequency of the charging signal (e.g., a frequency of the wireless charging signal 146) to increase or decrease the rate of charging at the receiver device 152. The ability to control or dynamically adjust the frequency of the charging signal may help minimize heat in the receiver device and/or the wireless charger device while optimizing the rate at which the receiver device charges a power source (e.g., the battery 156).

The method 500 may further include performing tracking and analysis using multiple windows, at 510. For example, the wireless charger device 102 may perform the one or more first measurements 110 using the first window 106 and the one or more second measurements 112 using the second window 108 to determine the first threshold 114 and the second threshold 116. As another example, the wireless charger device 102 may monitor for clamping pulses 148 based on the first threshold 114 and the second threshold 116.

The method 500 may further include determining whether a clamping pulse is detected with a pulse width within a range, at 512. For example, determining whether a clamping pulse is detected may include one or more of comparing the first edge 302 to the first threshold 114, comparing the second edge 304 to the second threshold 116, or comparing the pulse width 402 to the threshold pulse width 404. To further illustrate, the controller 104 may detect the clamping pulse 148 based on determining that the first edge 302 satisfies the first threshold 114, based on determining that the second edge 304 satisfies the second threshold 116, and further based on determining that the pulse width 402 satisfies the threshold pulse width 404.

If a clamping pulse is detected, the method 500 may further include determining whether the receiver device is charged to a target voltage, at 514. For example, a number of clamping pulses 148 received within a particular time interval or a duration of one or more clamping pulses 148 may indicate a charging state of the receiver device 152, and the target voltage may correspond to a particular charging state (such as eighty percent charged, as an illustrative example). If the receiver device is charged to the target voltage, the method 500 may end, at 516. For example, the wireless charger device 102 may terminate transmission of the wireless charging signal 146 to end the charging process. Alternatively, if the receiver device is not charged to the target voltage, the method 500 may continue at 510.

If no clamping pulse is detected, the method 500 may further include determining whether an interval between clamping pulses is less than a threshold, at 518. For example, in some implementations, the interval corresponds to an amount of time (e.g., a number of milliseconds) between successive clamping pulses 148, such as an amount of time from a rising edge of one clamping pulse 148 to a falling edge of a successive clamping pulse 148. In a non-limiting illustrative example, the threshold may correspond to 5 milliseconds.

If the interval between clamping pulses is less than the threshold, the method 500 may further include performing charging and frequency tuning, at 520, and the method 500 may continue at 508. In some other examples, if the interval between clamping pulses is less than the threshold, the method 500 may further include performing clamping pulse singularly analysis and calculation, at 522, and the method 500 may continue at 510. In some implementations, the clamping pulse singularly analysis and calculation includes one or more operations described with reference to FIG. 4. In some examples, the wireless charger device 102 may generate one or more alerts (such as the alert 132) in connection with the clamping pulse singularly analysis and calculation. For example, in some implementations, the wireless charger device 102 may detect, based on the clamping pulse singularly analysis and calculation, that the wireless charger device 102 is incorrectly positioned relative to the receiver device 152, and the alert 132 may indicate that the wireless charger device 102 is to be repositioned relative to the receiver device 152 (e.g., by adjusting an angle or distance between the wireless charger device 102 and the receiver device 152).

One or more aspects herein may improve performance of a wireless charging system. To illustrate, by using multiple windows of different durations to measure the output signal 140, a "short-term" noise characteristic may be determined in connection with one or more "long-term" parameters, such as maximum, minimum, and average values associated with the output signal 140. As a result, reliability and sensitivity of detection of clamping pulses received from the receiver device 152 may be improved, which may reduce or avoid instances of failure to detect a clamping pulse in some cases.

Alternatively or in addition, use of multiple thresholds may improve tracking of clamping pulses as compared to a single-threshold technique, such as by reducing or avoiding instances of "false positive" detection of clamping pulses that can result from noise or interference (e.g., sudden signal spikes or drops that may result from noise or interference). In some cases, reducing or avoiding false positive detection of one or more clamping pulses may avoid premature termination of the charging process that may result due to false positive identification of one or more clamping pulses. As a result, reliability and sensitivity of detection of clamping pulses may be improved as compared to some other techniques, such as single-threshold techniques.

Alternatively or in addition, use one or more of a pulse duration (or "width") of a clamping pulse or an interval between successive clamping pulses to identify noise or interference, which may be ignored by the wireless charger device 102. For example, if a pulse duration of a clamping pulse is outside a range of reference pulse durations, the wireless charger device 102 may ignore (or "reject") the clamping pulse. Alternatively or in addition, if an interval (e.g., "gap") between successive clamping pulses outside a range of reference intervals (such as if the interval is very short), the wireless charger device 102 may reject or ignore one or more clamping pulses. As a result, identification of "false positive" clamping pulses may be reduced or avoided, which may improve accuracy of the charging process (such as by avoiding premature termination of the charging process that may result due to false positive identification of one or more clamping pulses).

To further illustrate some aspects of the disclosure, the wireless charger device 102 may use a double shifting window for noise level characterization and determination. The double shifting window may correspond to a dual data window for charging signal detection and capturing. For example, a smaller window (e.g., 0.4 milliseconds to 1 millisecond) may be utilized to track and detect the signal floor and base noise, such as when there is no clamping pulse inside the window. A larger window (e.g., 40 milliseconds) may be utilized to check the average, maximum, and minimum signal strengths. Based on the signal strengths, an adaptive threshold may be determined and used to detect a falling edge and a rising edge of a clamping pulse. As a result, reliability and sensitivity of clamping pulse detection and characterization may be improved as compared to certain other techniques, such as a max-min threshold method, particularly in the presence of noise and interference, such as overshooting and hardware switching spikes. In some examples, the smaller window may correspond to the first window 106, and the larger window may correspond to the second window 108.

Alternatively or in addition to use of the double shifting window, the wireless charger device 102 may use adaptive averaging of signals for tuning detection with low and high amplitude thresholds. To illustrate, different percentage thresholds (e.g., single thresholds or multiple thresholds) may be used for detecting and capturing one or more clamping pulses. In such examples, a dual threshold-based pulse detection may be used, such as a threshold of 33% of an averaging signal for falling edge detection and a threshold of 66% of the averaging signal for rising edge detection. An automatic and adaptive mechanism of dynamic threshold selection based on a noise floor and a signal-to-noise ratio (SNR) may be used, such as by switching from 33% and 66% to 50% and 50%, as an illustrative example.

In some implementations, dynamic dual thresholding based on shifting averaging windowed charging cycle signals may enable adaptive real time charging and self-tuning based on signal variation. For example, signal variation may result from a baseline signal shift, floor noise variation, hardware switching spikes, jumping, or overshooting resulting from hardware power switch regulators and magnetic charging frequency switching.

Alternatively or in addition to use of one or both of the double shifting window or the adaptive averaging, the wireless charger device 102 may use signal jumping motion singularity detection and noise reduction. To illustrate, in some circumstances, a charging clamping signal train gap may be sporadic or unpredictable, which may cause the wireless charger device 102 to fail to detect one or more charging clamping pulses in some cases.

In some aspects of the disclosure, a signal jumping and motion singularity detection technique may enable the wireless charger device 102 to reject or reduce at least some signal variation based on charging cycle and clinical application data (such as historical information). To illustrate, a typical charging clamping pulse width may be approximately 0.4 to 1.1 milliseconds in some applications. If the wireless charger device 102 detects candidate clamping pulse with a pulse width of 0.05 milliseconds, the wireless charger device 102 may determine that the candidate clamping pulse corresponds to noise or distorted champing pulse signals and may discard the candidate clamping pulse. In some examples, the controller 104 executes instructions (e.g., firmware) that creates a detection buffer and threshold range (e.g., 0.3 to 1.5 milliseconds, plus or minus 0.1 milliseconds) for acceptance of the clamping pulse width. During the detection, a detection time register can be updated and used to count a number of instances of rejected candidate clamping pulses (e.g., "abnormal" pulses) or motion singularity. In some examples, if the singularity occurs sporadically, the counting register may be reset, such as after detection of a particular number of clamping pulses (e.g., after detection of 10 clamping pulses, as an illustrative example). In some other examples, if the singularity is detected for more than the particular number of clamping pulses (e.g., 10 to 20 clamping pulses), a warning signal (e.g., the alert 132) may be sent or generated to indicate a potentially abnormal charging situation (e.g., an unstable charging location or an overheating event). In some implementations, an alert may be generated or sent to a user. In some examples, a particular gap in clamping pulses (such as a 60 second continuous gap threshold or a 90 second continuous gap threshold) may be used for charging process termination. As a result, a user may select a charging position and location for high efficiency charging process, which may save time and reduce risk of overheating in some circumstances.

Figure 6:
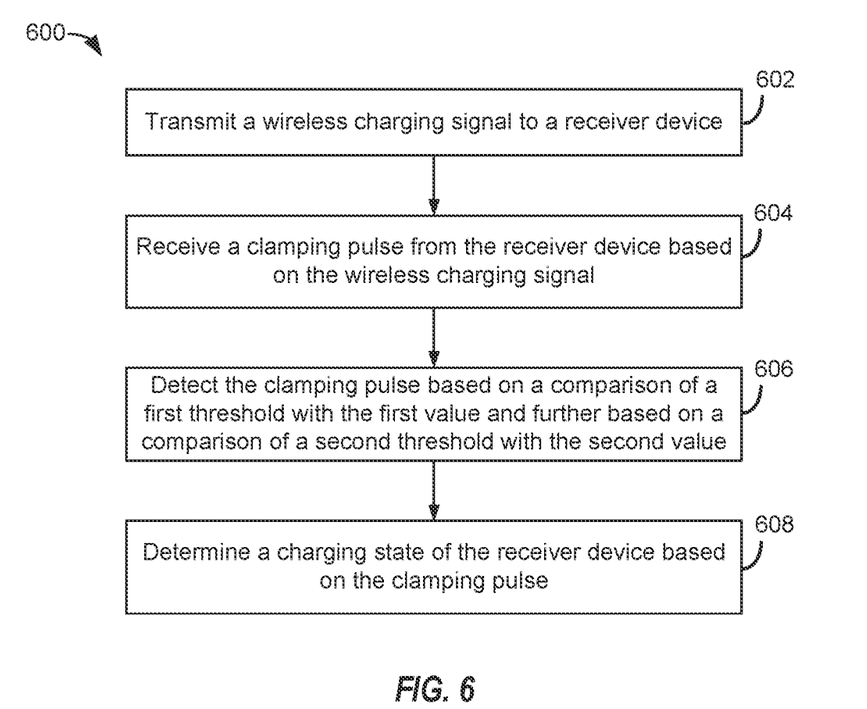
FIG. 6 is a flow chart of another example of a method of operation of a wireless charger device according to some aspects of the disclosure.

FIG. 6 is a flow chart of another example of a method 600 of operation of a wireless charger device according to some aspects of the disclosure. In some examples, operations of the method 600 are performed by the wireless charger device 102 of FIG. 1.

The method 600 includes transmitting a wireless charging signal to a receiver device, at 602. For example, the wireless charger device 102 may transmit the wireless charging signal 146 to the receiver device 152.

The method 600 further includes receiving a clamping pulse from the receiver device based on the wireless charging signal, at 604. The clamping pulse indicates a first value associated with a falling edge of the clamping pulse and further indicates a second value associated with a rising edge of the clamping pulse. The method 600 further includes detecting the clamping pulse based on a comparison of a first threshold with the first value and further based on a comparison of a second threshold with the second value, at 606. As described above, the second threshold is different than the first threshold. To illustrate, the wireless charger device 102 may receive the clamping pulse 148 from the receiver device 152, and the clamping pulse 148 may indicate the first value V1 (e.g., a minimum value or local minimum value) that corresponds to the first edge 302 and may indicate the second value V2 (e.g., a maximum value or local maximum value) that corresponds to the second edge 304. The wireless charger device 102 may detect the first edge 302 by determining that the first value V1 fails to satisfy the first threshold 114 and may detect the second edge 304 by determining that the second value V2 satisfies the second threshold 116.

The method 600 further includes determining a charging state of the receiver device based on the clamping pulse, at 608. For example, the wireless charger device 102 may determine whether a charging state of the receiver device 152 satisfies a charging threshold. In some examples, the wireless charger device 102 may continue charging of the receiver device 152 based on the charging state of the receiver device 152 failing to satisfy the charging threshold. In some other examples, the wireless charger device 102 may terminate charging of the receiver device 152 based on the charging state of the receiver device 152 satisfying the charging threshold.

In some examples, the wireless charger device 102 includes circuitry configured to initiate, perform, or control one or more operations described herein, such as one or more operations of the method 600. For example, the circuitry may be configured to receive the clamping pulse 148 from the receiver device 152, to detect the first edge 302 by determining that the first value V1 fails to satisfy the first threshold 114, to detect the second edge 304 by determining that the second value V2 satisfies the second threshold 116, and to determine a charging state of the receiver device 152 based on the clamping pulse 148. In some examples, the circuitry includes the controller 104. Alternatively or in addition, the circuitry may include the power delivery and load monitoring circuit 136.

To further illustrate, one or more operations described herein may be performed using a processor (such as the controller 104) that executes instructions. As an illustrative example, the controller 104 may execute a compare instruction to determine whether the first value V1 satisfies the first threshold 114 and to determine whether the second value V2 satisfies the second threshold 116. Alternatively or in addition, the power delivery and load monitoring circuit 136 may include a comparator circuit configured to determine whether the first value V1 satisfies the first threshold 114 and to determine whether the second value V2 satisfies the second threshold 116.

Further, those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein may include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and operations described herein may be implemented using electronic hardware, computer software, or combinations of both. To illustrate, various illustrative components, blocks, modules, circuits, and operations have been described generally in terms of their functionality. Whether such functionality is implemented as hardware or software depends upon the particular application and design of the overall system. Skilled artisans may implement the described functionality in varying ways for each particular application, but such implementation decisions should not be interpreted as causing a departure from the scope of the disclosure. Skilled artisans will also readily recognize that the order or combination of components, methods, or interactions that are described herein are provided as examples and that the components, methods, or interactions of the various aspects of the present disclosure may be combined or performed in ways other than those illustrated and described herein.

A hardware and data processing apparatus may be used to implement the various illustrative logics, logical blocks, modules, and circuits described in connection with the aspects disclosed herein and may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, a data processing apparatus.

If implemented in software, the functions may be stored on or transmitted over as one or more instructions or code on a computer-readable medium. The processes of a method or process disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store program code in the form of instructions or data structures and that may be accessed by a computer. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or process may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

The invention claimed is:

1. A method of operation of a wireless charger device, the method comprising:
  transmitting a wireless charging signal to a receiver device;
  receiving a clamping pulse from the receiver device based on the wireless charging signal, wherein the clamping pulse indicates a first value associated with a falling edge of the clamping pulse and further indicates a second value associated with a rising edge of the clamping pulse;
  detecting the clamping pulse based on a comparison of a first threshold with the first value and further based on a comparison of a second threshold with the second value, wherein the second threshold is different than the first threshold,
  wherein determining the first threshold and the second threshold includes:
    during a first window of a first duration, performing one or more first measurements of an output signal used to generate the wireless charging signal;
    during a second window of a second duration greater than the first duration, performing one or more second measurements of the output signal;
    based on the one or more first measurements, determining one or more first parameters associated with the output signal;
    based on the one or more second measurements, determining one or more second parameters associated with the output signal;
    configuring the first threshold based on the one or more first parameters; and
    configuring the second threshold based on the one or more second parameters; and
  determining a charging state of the receiver device based on the clamping pulse.

2. The method of claim 1, further comprising adjusting transmission of the wireless charging signal to the receiver device based on the charging state of the receiver device.

3. The method of claim 1, further comprising determining the first threshold and the second threshold during transmission of the wireless charging signal to the receiver device.

4. The method of claim 1, wherein the one or more first parameters include a floor noise value associated with the output signal, and wherein the one or more second parameters include an average value of the output signal, a minimum value of the output signal, and a maximum value of the output signal.

5. The method of claim 1, further comprising:
  determining a pulse width of the clamping pulse based on a time interval between the falling edge and the rising edge; and determining that the pulse width satisfies a threshold pulse width.

6. The method of claim 5, further comprising determining the threshold pulse width using a detection buffer during transmission of the wireless charging signal to the receiver device.

7. The method of claim 5, further comprising:
- detecting one or more candidate clamping pulses;
- determining, for each candidate clamping pulse of one or more candidate clamping pulses, whether a pulse width of the candidate clamping pulse satisfies the threshold pulse width; and
- based on a particular pulse width of a particular candidate clamping pulse of the one or more candidate clamping pulses failing to satisfy the threshold pulse width, rejecting the particular candidate clamping pulse, wherein rejecting the particular candidate clamping pulse includes determining that the particular candidate clamping pulse fails to accurately indicate the charging state of the receiver device.

8. The method of claim 7, further comprising:
- after rejecting the particular candidate clamping pulse, determining that a number of rejected candidate clamping pulses satisfies a threshold number of rejected candidate clamping pulses; and
- generating an alert based on determining that the number of rejected candidate clamping pulses satisfies the threshold number.

* * * * *